United States Patent
Sade et al.

(10) Patent No.: US 7,571,279 B2
(45) Date of Patent: Aug. 4, 2009

(54) ACCESSING A DISK DRIVE AT MULTIPLE SPEEDS

(75) Inventors: Gilad Sade, Newton, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 373 days.

(21) Appl. No.: 11/529,125

(22) Filed: Sep. 28, 2006

(65) Prior Publication Data

US 2008/0082740 A1  Apr. 3, 2008

(51) Int. Cl.
*G06F 12/00* (2006.01)
(52) U.S. Cl. .................. 711/112; 711/154; 711/167; 360/73.03
(58) Field of Classification Search ................ 711/112, 711/154, 167; 360/73.03
See application file for complete search history.

(56) References Cited

U.S. PATENT DOCUMENTS 6,515,817 B1 * 2/2003 Hamaguchi et al. ...... 360/73.03
6,798,603 B1   9/2004 Singh et al.
2002/0191328 A1 * 12/2002 Hamaguchi et al. ...... 360/78.04
2005/0154962 A1   7/2005 Grover et al.

OTHER PUBLICATIONS

Okada et al., A Novel Drive Architecture of HDD: "multimode hard discdrive," pp. 92-93, IEEE, Jun. 2000.*
Gurumurthi et al., "DRPM: Dynamic Speed Control for Power Management in Server Class Disks," pp. 169-179, IEEE, Jun. 2003.*

* cited by examiner

*Primary Examiner*—Stephen C Elmore
(74) *Attorney, Agent, or Firm*—BainwoodHuang

(57) ABSTRACT

A disk drive apparatus has a magnetic platter, a disk drive motor, and a disk drive controller. The disk drive controller is capable of storing data onto and retrieving data from the magnetic platter while the magnetic platter turns at a predefined maximum speed. The disk drive controller is configured to receive a command to access a storage location on the magnetic platter from an external storage controller, and direct the disk drive motor to increase rotational speed of the magnetic platter to the predefined maximum speed in response to the command. The disk drive controller is further configured to, prior to the magnetic platter reaching the predefined maximum speed, access the storage location on the magnetic platter in response to the command. Accordingly, early access to storage locations on the magnetic platter is not substantially hindered by the spin up process.

20 Claims, 4 Drawing Sheets

ACCESSING A DISK DRIVE AT MULTIPLE SPEEDS

BACKGROUND

In general, conventional hard disk drives are the primary source of non-volatile storage in a variety of computerized systems and settings. Such computerized environments include laptop computers, desktop computers, data storage arrays, enterprise-style data storage systems, storage area networks (SANs) and Network Attached Storage (NAS), among others.

One conventional hard disk drive includes a control circuit, a motor and magnetic platters. The control circuit signals the motor to spin up the magnetic platters from a stationary (i.e., non-moving) position to a full operating speed. Then, while the magnetic platters spin at the full operating speed, the control circuit carries out load and store operations whereby heads of the control circuit read data from and write data to the spinning magnetic platters.

Some hard disk drives, such as those of a data storage system, are designed to rotate constantly at a very high speed (e.g., 10,000 RPM). These hard disk drives are designed to provide extremely fast average response times due, at least in part, to their extremely fast platter speeds. Additionally, these hard disk drives are designed to run at the full operating speed essentially all the time and to stop only occasionally, e.g., when the data storage system as a whole is shutdown for maintenance or repair.

SUMMARY

Unfortunately, there are deficiencies to the above-described conventional hard disk drives. For example, the above-described conventional hard disk drives which are designed to run continuously at a very high speed require a very long amount of time to spin up from a stationary position to a full operating speed. For some hard disk drives, this amount of time may be one to two minutes or even longer. Moreover, until the hard disk drives reach their full operating speeds, the hard disk drives do not provide access to storage locations on the rotating magnetic platters. Accordingly, the response time for any access attempt initiated when the hard disk drives start from a stationary position may be extremely long.

In contrast to the above-described conventional hard disk drives, an improved disk drive apparatus is capable of storing data onto and retrieving data from a magnetic platter while the magnetic platter turns at a predefined maximum speed. However, the disk drive apparatus is further configured to access storage locations on the magnetic platter prior to the magnetic platter reaching the predefined maximum speed. Accordingly, access to the storage locations is not limited to waiting until the magnetic platter reaches the predefined maximum speed. Rather, such access can occur while the magnetic platter is still spinning up thus providing an improved response time during the spin up period of the disk drive apparatus.

One embodiment is directed to a disk drive apparatus having a magnetic platter, a disk drive motor coupled to the magnetic platter, and a disk drive controller coupled to the magnetic platter and the disk drive motor. The disk drive controller is capable of storing data onto and retrieving data from the magnetic platter while the magnetic platter turns at a predefined maximum speed (e.g., 10,000 RPM). The disk drive controller is configured to receive a command to access a storage location on the magnetic platter from an external storage controller, and direct the disk drive motor to increase rotational speed of the magnetic platter to the predefined maximum speed in response to the command. The disk drive controller is further configured to, prior to the magnetic platter reaching the predefined maximum speed, access the storage location on the magnetic platter in response to the command (e.g., while the magnetic platter rotates at an intermediate speed of 1,000 RPM). Accordingly, early access to storage locations on the magnetic platter is not substantially hindered by the spin up process.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved disk drive apparatus is capable of storing data onto and retrieving data from a magnetic platter while the magnetic platter turns at a predefined maximum speed. However, the disk drive apparatus is further configured to access storage locations on the magnetic platter prior to the magnetic platter reaching the predefined maximum speed. Accordingly, early access to storage locations on the magnetic platter is not substantially hindered by the spin up process.

Figure 1:
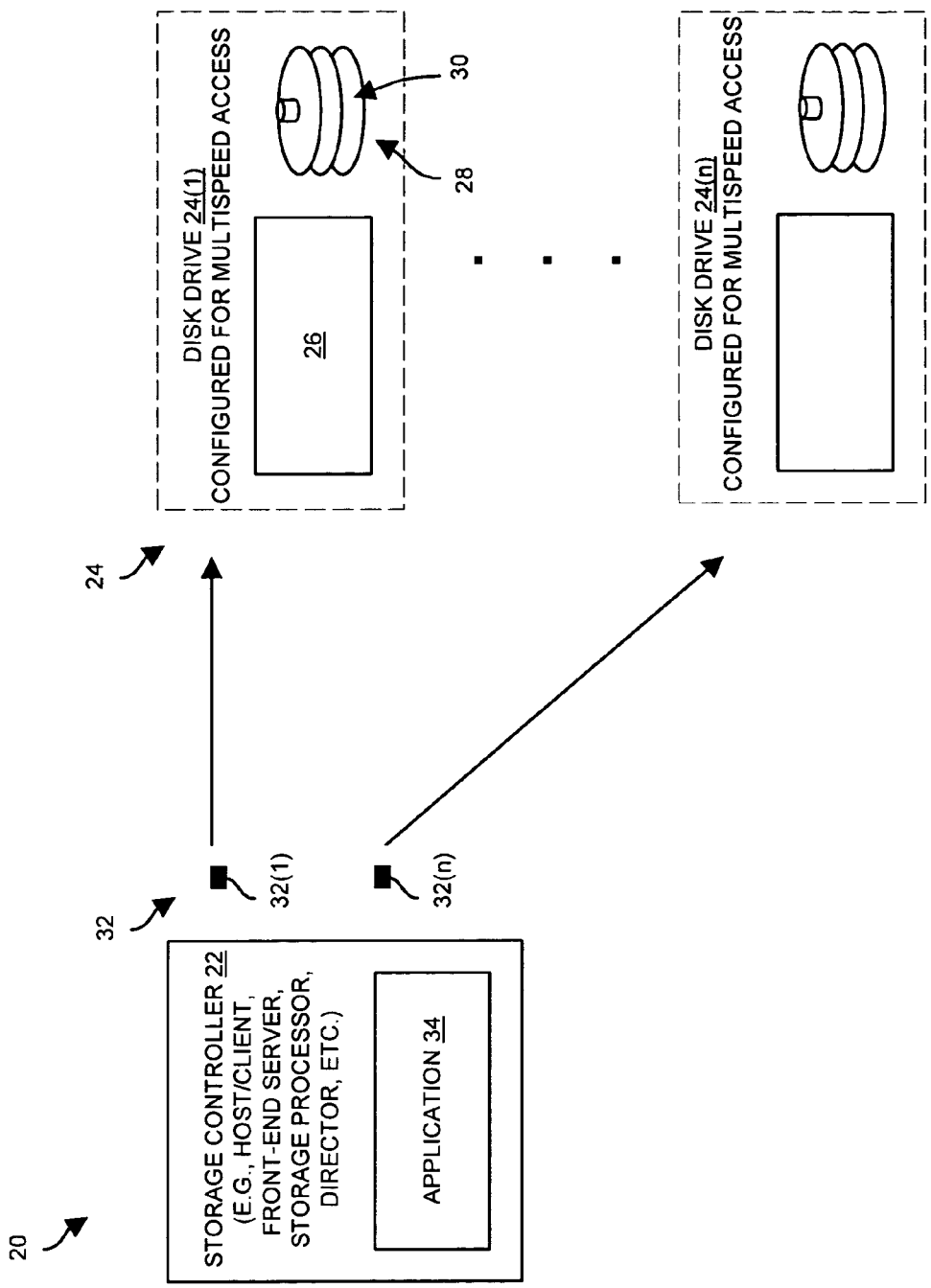
FIG. 1 is a block diagram of a data storage system which employs disk drives configured to access data from magnetic platters rotating at multiple speeds.

FIG. 1 is a block diagram of a data storage system 20 having a storage controller 22 and a set of disk drives 24(1), . . . , 24(n) (i.e., one or more disk drives 24) coupled to the storage controller 22. Each disk drive 24 includes electronic circuitry 26 and multiple magnetic hard disk platters 28 (or disks) which rotate on a common spindle (e.g., see the disk drive 24(1)). The electronic circuitry 26 is capable of accessing storage locations 30 on these magnetic platters 28 while the magnetic platters 28 rotate at a predefined maximum speed (e.g., 10,000 RPM) or alternatively at an intermediate speed (e.g., 1,000 RPM) which is substantially slower than the predefined maximum speed, e.g., during step function spin-up.

During operation, the storage controller 22 is configured to send commands 32 to the set of disk drives 24. Such commands 32 may be generated by an application 34 needing access the storage locations 30 on the set of disk drives 24 in order to carry out a variety of data storage operations (e.g., load and store operations, database access operations, backup operations, volume management and optimization operations, and so on). In some arrangements, the storage controller 22 operates as a host/client device which requires access to data. In other arrangements, the storage controller 22 operates as an interface (e.g., a front-end server, a storage processor, a director, etc.) in order to provide data storage system services to one or more external client devices.

During such operation, the storage controller 22 sends the commands 32 (i.e., commands 32(1), . . . , 32(n)) to the electronic circuitry 26 of respective disk drives 24 to access data from the storage locations 30 on the magnetic platters 28 of the respective disk drives 24. If the magnetic platters 28 of the disk drives 24 are already spinning at their predefined maximum speeds, the disk drives 24 are in their peak states of readiness and able to service the commands 32 immediately after receipt in the quickest manner possible.

However, if the magnetic platters 28 of the disk drives 24 are not spinning at their predefined maximum speeds, the disk drives 24 are nevertheless able to service the commands 32 in a relatively quick manner. In particular, the electronic circuitry 26 of the disk drives 24 is configured to access the storage locations 30 on their magnetic platters 28 prior to their magnetic platters 28 reaching their predefined maximum speed.

For example, suppose that the disk drives 24 are completely spun down to save power. In this state, the magnetic platters 28 of the disk drives 24 may take several seconds or even one or two minutes to reach their predefined maximum speed. However, further suppose that the disk drives 24 are able to access storage locations 30 on the disk drives 24 while the magnetic platters 28 rotate at a very slow rate such as 1,000 RPM. As such, the electronic circuitry 26 is capable of spinning up the magnetic platters 28 from the non-rotating state to this very slow rate in a very short amount of time, and then performing the data access operation while continuing to rotate the magnetic platters 28 at this very slow rate. Accordingly, the disk drives 24 can attend to initial commands 32 with very desirable response times (i.e., the disk drives 24 only need to spin up to the slow rate) rather than delaying access until the magnetic platters 28 reach the predefined maximum speed. Further details will now be provided with reference to FIG. 2.

Figure 2:
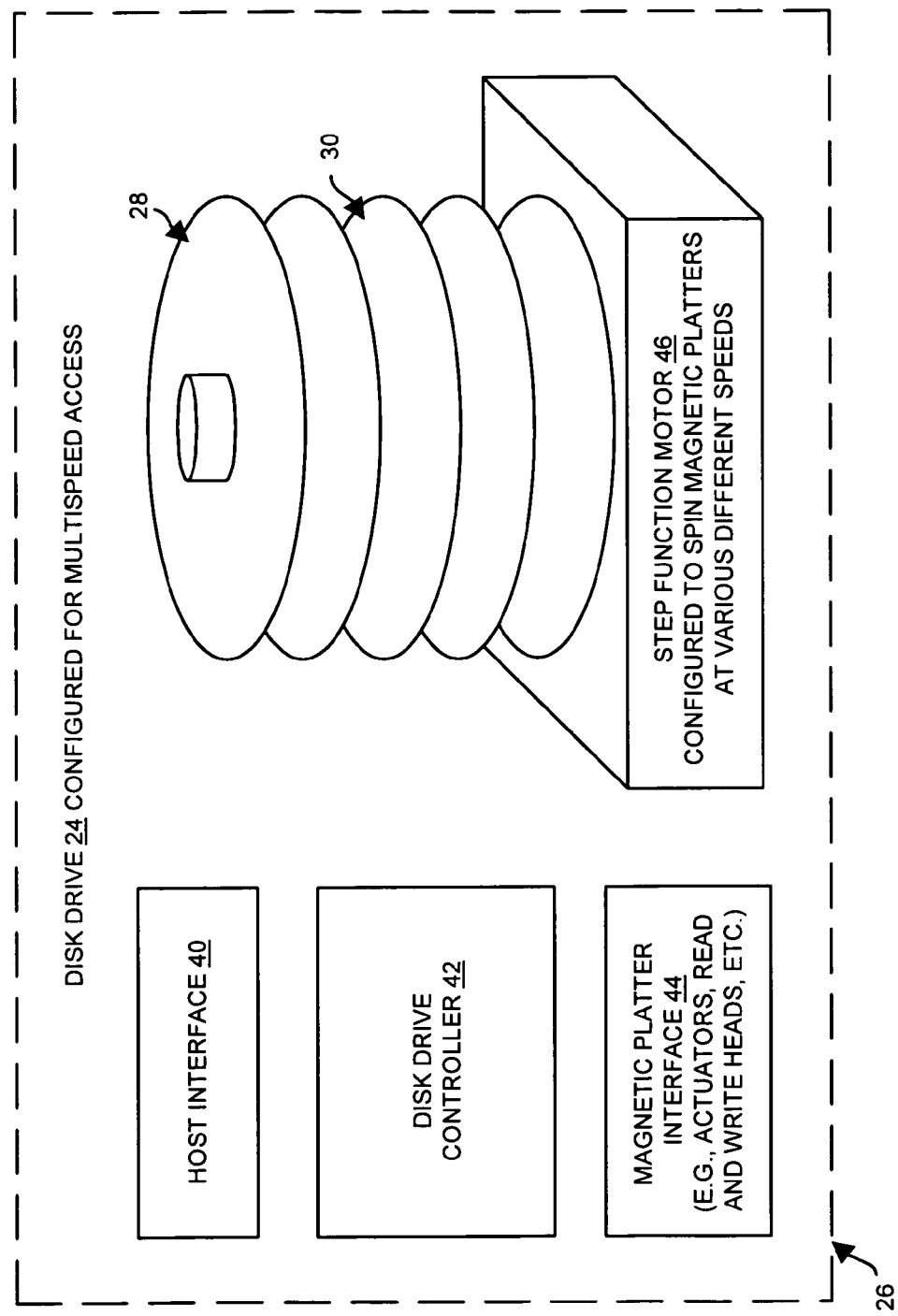
FIG. 2 is a block diagram of a disk drive of the data storage system of FIG. 1.

FIG. 2 is a block diagram of a disk drive 24 which is configured to provide data access at more than one magnetic platter speed. As shown in FIG. 2, the electronic circuitry 26 of the disk drive 24 includes a host interface 40, a disk drive controller 42, a magnetic platter interface 44 and a step function motor 46.

The disk drive controller 42 is configured to communicate with the storage controller 22 (FIG. 1) through the host interface 40. In some arrangements, the host interface 40 supports a well-known disk access protocol such as SCSI, SATA, Fibre Channel, or the like.

The disk drive controller 42 is further configured to load data from and store data onto the magnetic platters 28 through the magnetic platter interface 46. Here, the disk drive controller 42 operates an assembly of actuators, read heads and write heads to robustly and reliably access the storage locations 30 on the magnetic surfaces 30 of the rotating magnetic platters 28. As part of this accessing operation, the disk drive controller 42 sends signals to the step function motor 46 to rotate the magnetic platters 28 at particular speeds. Further details will now be provided with reference to FIG. 3.

Figure 3:
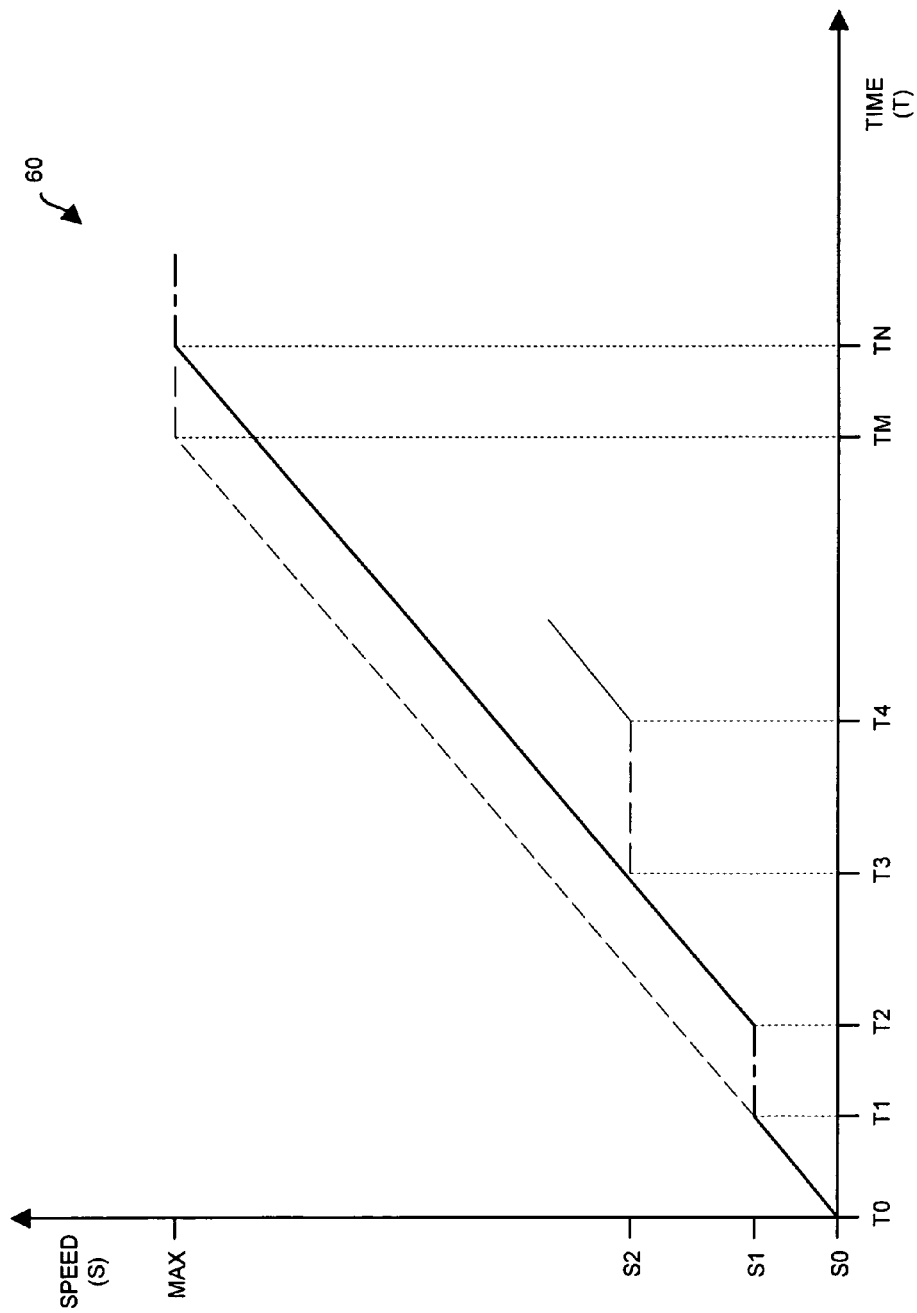
FIG. 3 is a graph of speed vs. time for an example operating pattern for the disk drive of FIG. 2.

FIG. 3 is a graph 60 for an example operating pattern for a disk drive 24. Time (T) is on the horizontal axis, and speed (S) is on the vertical axis. In this example, the magnetic platters 28 of the disk drive 24 are initially in a non-rotating state (i.e., 0 RPM) at T0. If the disk drive controller 42 directs the motor 46 to spin up the magnetic platters 28 from this static position to the predefined maximum speed MAX, the magnetic platters 28 reach the predefined maximum speed MAX at time TM (e.g., many seconds).

Fortunately, the disk drive controller 42 is capable of reading data from the storage locations 30 on the magnetic platters 28 and writing data to the storage locations 30 on the magnetic platters 28 at an intermediate speed S1 which is slower than the predefined maximum speed MAX. In some arrangements, the predefined maximum speed MAX is greater than five times this intermediate speed S1, e.g., 10,000 RPM vs. 1,000 RPM. In particular, the motor 46 spins up the magnetic platters 28 to the intermediate speed S1 at time T1 (e.g., a few seconds) which is significantly shorter than time TM. The motor 46 preferably maintains the magnetic platters 28 constantly at the intermediate speed S1 for a brief amount of time (e.g., on the order of milliseconds) prior to accessing the storage locations 30 and then during access of the storage locations 30 to enable reliable data access. Moreover, the disk drive controller 42 can continue to run the motor 46 at the intermediate speed S1 for an extended period of time if there are multiple commands 32 requiring attention, e.g., until time T2. Accordingly, the disk drive 24 provides substantially improved data access response time over conventional disk drives which do not provide data access until their magnetic platters reach their full operating speed.

Once the initial commands 32 have been processed, the disk drive controller 42 resumes spinning up the magnetic platters 28 which eventually reach the predefined maximum speed MAX at time TN. Once the magnetic platters 28 reach the predefined maximum speed MAX, the disk drive controller 42 is configured to respond to further data access commands 32 where these further access commands 32 enjoy extremely low latency.

As further shown in FIG. 3, the disk drive 24 is capable of attending to commands 32 which it receives in the middle of the spin up process. For example, suppose that the disk drive controller 42 receives a command 32 shortly after time T2 when resuming the spin process. The disk drive controller 42 is configured to respond to this command 32 by directing the motor 46 to stop increasing the speed of the magnetic platters 28 and to maintain the magnetic platters 28 constantly at the increased speed S2 (e.g., 3,200 RPM) for a brief amount of time prior to accessing the storage locations 30 (e.g., on the order of milliseconds) and then during access of the storage locations 30. As shown by the horizontal dashed line in FIG. 3, this increased speed S2 is greater than the intermediate speed S1 and less than the predefined maximum speed MAX. Once the disk drive controller 32 has processed the command 32, the disk drive controller 32 can continue the spin up process, e.g., see time T4. Accordingly, the disk drive 24 is capable of responding to a command 32 by starting the spin up process, temporarily holding the magnetic platter speed constant during an initial access, and then resuming the spin up process. The disk drive is further capable of responding to additional commands 32 dynamically during the spin up process. Further details will now be provided with reference to FIG. 4.

Figure 4:
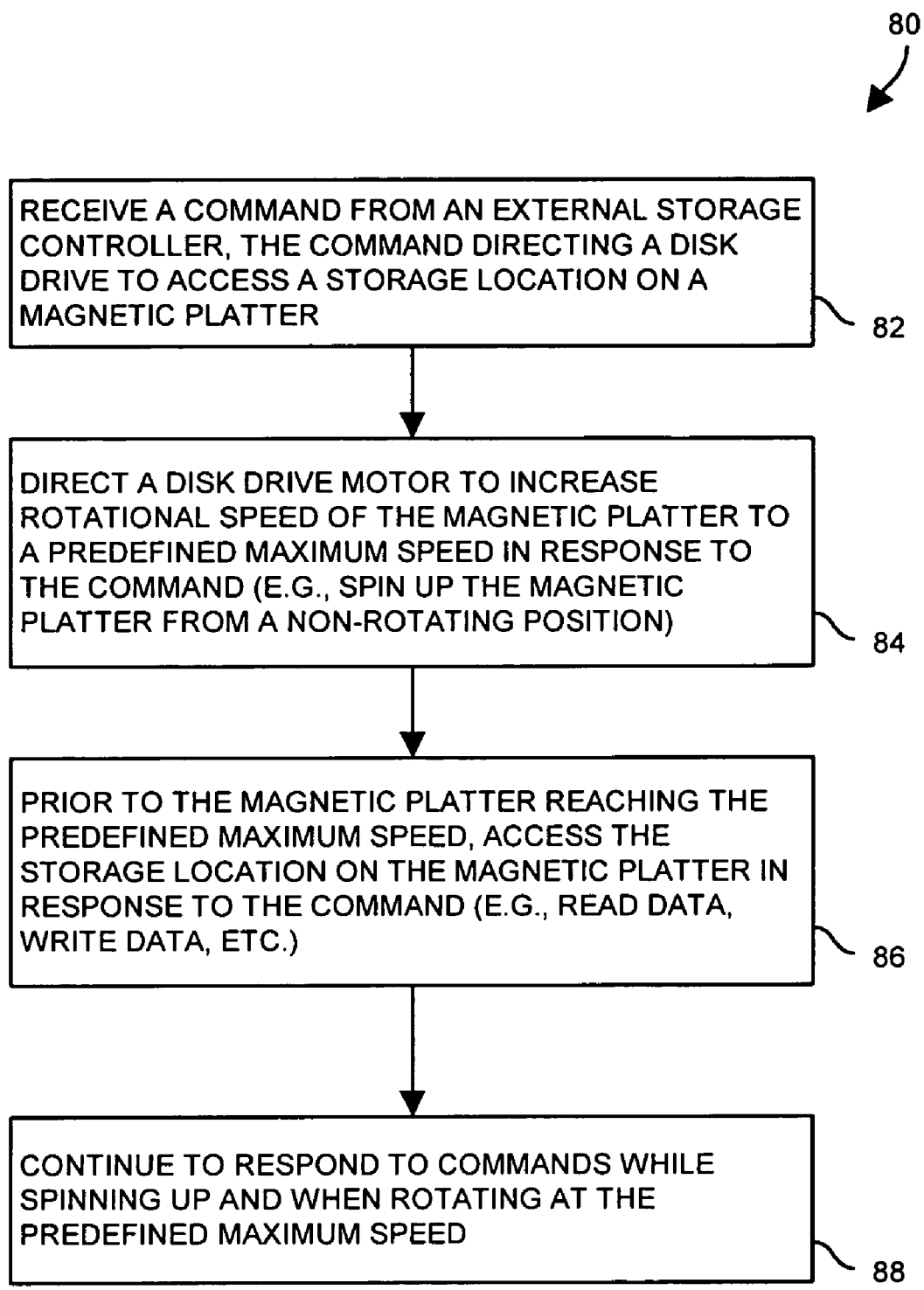
FIG. 4 is a flowchart of a procedure which is carried out by the disk drive of FIG. 2.

FIG. 4 is a flowchart of a procedure 80 which is carried out by the disk drive controller 42 of a disk drive 24. In step 82, the disk drive controller 42 receives a command 32 (FIG. 1) from the storage controller 22. The command 32 directs the disk drive 24 to access a storage location 30 on a magnetic platter 28 (e.g., read data, write data, etc.).

In step 84, the disk drive controller 42 directs the motor 46 to spin up the magnetic platters 28. In particular, the disk drive controller 42 directs the motor 46 to spin up to the intermediate speed S1 (FIG. 3) in response to the command 32.

In step 86, the disk drive controller 42 accesses the storage location 30 using the magnetic platter interface 44 while the magnetic platter rotates at the intermediate speed S1. Accordingly, the disk drive 24 provides faster response time than would be achieved if the disk drive controller 42 waited for the motor 46 to spin up to the predefined maximum speed MAX prior to accessing the storage location 30.

In step 88, the disk drive controller 42 resumes the spin up process by directing the motor 46 to continue to spin up the magnetic platter 28 to the predefined maximum speed MAX. As explained earlier in connection with FIG. 3, the disk drive controller 42 is configured to process further commands 32 during the rest of the spin up process and once the magnetic platter 28 is finally at the predefined maximum speed MAX.

As described above, an improved disk drive 24 is capable of storing data onto and retrieving data from a magnetic platter 28 while the magnetic platter 28 turns at a predefined maximum speed MAX. However, the disk drive 24 is further configured to access storage locations 30 on the magnetic platter 28 prior to the magnetic platter 28 reaching the predefined maximum speed MAX. Accordingly, access to the storage locations 30 is not limited to waiting until the magnetic platter 28 reaches the predefined maximum speed MAX. Rather, such access can occur while the magnetic platter 28 is still spinning up thus providing an improved response time during the spin up period of the disk drive 24.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data storage system, comprising:
   a storage controller; and
   a set of disk drives coupled to the storage controller, each disk drive having magnetic platter, each disk drive being capable of storing data onto and retrieving data from the magnetic platter while the magnetic platter turns at a predefined maximum speed, and each disk drive being configured to:
      receive a command to access a storage location on the magnetic platter from the storage controller,
      increase rotational speed of the magnetic platter to the predefined maximum speed in response to the command, and
      prior to the magnetic platter reaching the predefined maximum speed, access the storage location on the magnetic platter in response to the command;
   wherein each disk drive, when accessing the storage location on the magnetic platter in response to the command, is configured to:
   access the storage location on the magnetic platter of that disk drive while the magnetic platter rotates at an intermediate speed, the predefined maximum speed being at least five times greater than the intermediate speed.

2. A data storage system as in claim 1 wherein each disk drive is configured to receive the command to access the storage location while the magnetic platter of that disk drive is in a non-rotating position; and wherein each disk drive, when increasing the rotational speed of the magnetic platter to the predefined maximum speed in response to the command, is configured to:
   spin up the magnetic platter of that disk drive from the non-rotating position to the predefined maximum speed.

3. A data storage system as in claim 1 wherein each disk drive is further configured to:
   access a storage location on the magnetic platter of that disk drive while the magnetic platter of that disk drive rotates at an increased speed in response to another command, the increased speed being (i) faster than the intermediate speed and (ii) slower than the predefined maximum speed.

4. A disk drive apparatus, comprising:
   a magnetic platter;
   a disk drive motor coupled to the magnetic platter; and
   a disk drive controller coupled to the magnetic platter and the disk drive motor, the disk drive controller being capable of storing data onto and retrieving data from the magnetic platter while the magnetic platter turns at a predefined maximum speed, the disk drive controller being configured to:
      receive a command to access a storage location on the magnetic platter from an external storage controller,
      direct the disk drive motor to increase rotational speed of the magnetic platter to the predefined maximum speed in response to the command, and
      prior to the magnetic platter reaching the predefined maximum speed, access the storage location on the magnetic platter in response to the command;
   wherein the disk drive controller, when accessing the storage location on the magnetic platter in response to the command, is configured to:
   access the storage location on the magnetic platter while the magnetic platter rotates at an intermediate speed, the predefined maximum speed being at least five times greater than the intermediate speed.

5. A disk drive apparatus as in claim 4 wherein the disk drive controller is configured to receive the command to access the storage location while the magnetic platter of that disk drive is in a non-rotating position; and wherein the disk drive controller, when directing the disk drive motor to increase the rotational speed of the magnetic platter to the predefined maximum speed in response to the command, is configured to:
   direct the disk drive motor to spin up the magnetic platter of that disk drive from the non-rotating position to the predefined maximum speed.

6. A disk drive apparatus as in claim 5 wherein the disk drive controller, when accessing the storage location on the magnetic platter in response to the command, is configured to:
   when the command is a read instruction, read data from the storage location on the magnetic platter while the magnetic platter rotates at a speed which is slower than the predefined maximum speed.

7. A disk drive apparatus as in claim 5 wherein the disk drive controller, when accessing the storage location on the magnetic platter in response to the command, is configured to:
   when the command is a write instruction, write data to the storage location on the magnetic platter while the magnetic platter rotates at a speed which is lower than the predefined maximum speed.

8. A disk drive apparatus as in claim 4 wherein the disk drive controller is further configured to:
   prior to accessing the storage location on the magnetic platter while the magnetic platter rotates at the intermediate speed, hold rotation of the magnetic platter at the intermediate speed for a constant amount of time.

9. A disk drive apparatus as in claim 4 wherein the disk drive controller is further configured to:
   access a storage location on the magnetic platter while the magnetic platter rotates at an increased speed in response to another command, the increased speed being (i) faster than the intermediate speed and (ii) slower than the predefined maximum speed.

10. A disk drive apparatus as in claim 9 wherein the disk drive controller is further configured to:
receive other commands to access the magnetic platter; maintain rotation of the magnetic platter at the predefined maximum speed in response to the other commands; and
in response to the other commands, access storage locations on the magnetic platter while the magnetic platter continues to rotate at the predefined maximum speed.

11. In a disk drive having a magnetic platter, the disk drive being capable of storing data onto and retrieving data from the magnetic platter while the magnetic platter turns at a predefined maximum speed, a method comprising:
receiving a command to access a storage location on the magnetic platter;
increasing rotational speed of the magnetic platter to the predefined maximum speed in response to the command; and
prior to the magnetic platter reaching the predefined maximum speed, accessing the storage location on the magnetic platter in response to the command;
wherein accessing the storage location on the magnetic platter in response to the command includes:
accessing the storage location on the magnetic platter while the magnetic platter rotates at an intermediate speed, the predefined maximum speed being at least five times greater than the intermediate speed.

12. A method as in claim 11 wherein receiving the command to access the storage location occurs while the magnetic platter is in a non-rotating position; and wherein increasing the rotational speed of the magnetic platter to the predefined maximum speed in response to the command includes:
spinning up the magnetic platter from the non-rotating position to the predefined maximum speed.

13. A method as in claim 12 wherein the command is a read instruction; and wherein accessing the storage location on the magnetic platter in response to the command includes:
in response to the read instruction, reading data from the storage location on the magnetic platter while the magnetic platter rotates at a speed which is slower than the predefined maximum speed.

14. A method as in claim 12 wherein the command is a write instruction; and wherein accessing the storage location on the magnetic platter in response to the command includes:
in response to the write instruction, writing data to the storage location on the magnetic platter while the magnetic platter rotates at a speed which is lower than the predefined maximum speed.

15. A method as in claim 11, further comprising:
prior to accessing the storage location on the magnetic platter while the magnetic platter rotates at the intermediate speed, holding rotation of the magnetic platter at the intermediate speed for a constant amount of time.

16. A method as in claim 11, further comprising:
accessing a storage location on the magnetic platter while the magnetic platter rotates at an increased speed in response to another command, the increased speed being (i) faster than the intermediate speed and (ii) slower than the predefined maximum speed.

17. A method as in claim 16, further comprising:
receiving other commands to access the magnetic platter;
maintaining rotation of the magnetic platter at the predefined maximum speed in response to the other commands; and
in response to the other commands, accessing storage locations on the magnetic platter while the magnetic platter continues to rotate at the predefined maximum speed.

18. A data storage system as in claim 1 wherein the intermediate speed is 3,200 RPM or less.

19. A disk drive apparatus as in claim 4 wherein the intermediate speed is 3,200 RPM or less.

20. A method as in claim 11 wherein accessing the storage location on the magnetic platter while the magnetic platter rotates at the intermediate speed includes accessing the storage location while the magnetic platter rotates at 3,200 RPM or less.

* * * * *